Patented June 25, 1946

2,402,776

UNITED STATES PATENT OFFICE 2,402,776

PREPARATION OF WATER-REPELLENT TEXTILES

Hillary Robinette, Jr., Arlington, Va., assignor to Commercial Solvents Corporation, Terre Haute, Ind., a corporation of Maryland No Drawing. Application March 23, 1944, Serial No. 527,821

7 Claims. (Cl. 8—115.6)

The present invention relates to new and useful waterproofing agents and to textile materials which have been treated therewith. More particularly, it concerns a waterproofing composition having as its principal active ingredient a higher fatty acid ester of a nitro hydroxy compound.

One of the chief disadvantages of many of the known processes for rendering fibrous materials, especially textiles, water-repellent, or impervious to water, is that the water-proofed materials so treated lose their water-repellent properties rather readily on washing or subjecting to elevated temperatures. It has previously been proposed to waterproof textiles and other fibrous materials by impregnating the same with various quaternary ammonium chlorides prepared by reacting tertiary amines and an alkoxymethyl chloride in which the alkoxy portion is related to a long chain alcohol, and thereafter heating the impregnated material to a temperature such that the quaternary ammonium compound is decomposed. The tertiary amines which have been proposed for this purpose have not, however, met with unqualified success. Many of such water-repellent agents of this type require such high temperatures for decomposition that the fabric so treated is frequently injured.

It is an object of this invention to produce waterproofed fabrics which possess a wash-fast finish and which retain their water-repellent characteristic after being ironed, or otherwise heated.

These and other objects may be accomplished by the utilization of solutions or emulsions containing nitro esters having the following general structural formula:

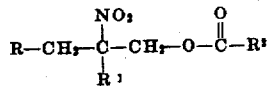

wherein R may represent either aliphatic acyloxy, hydrogen, alkyl, or hydroxyl, $R^1$ may represent aliphatic acyloxymethyl, hydrogen, alkyl or hydroxymethyl, and $R^2$ is an alkyl group having from eleven to seventeen carbon atoms.

Examples of esters included by the above generic formula and which serve as waterproofing agents in my invention are tris(stearoxymethyl)nitromethane, 2-nitrobutyl stearate, 2-nitro-2-methyl-1,3-propanediol distearate, 2-nitrobutyl laurate, tris(lauroxymethyl)nitromethane, 2-nitro-2-methyl-1,3-propanediol dipalmitate, stearoxymethylbis(hydroxymethyl)-nitromethane, 2-nitro-2-methyl-1,3-propanediol monostearate, 2-nitroisobutyl stearate, 2-nitroisobutyl laurate, 2-nitroisobutyl palmitate, 2-nitrobutyl palmitate, tris(palmitoxymethyl)nitromethane, palmitoxymethylbis(hydroxymethyl)nitromethane, and the like.

Nitro esters of the above type may readily be prepared by reacting the desired higher fatty acids with a suitable nitro hydroxy compound in the presence of an esterification catalyst such as p-toluenesulfonic acid, or sulfuric acid and aluminum sulfate at a temperature of between 100°–150° C. This reaction is preferably effected in the presence of an organic liquid such as benzene, toluene, xylene, etc., which is capable of removing the water formed during the esterification reaction, as a constant boiling mixture. If a completely esterified product is desired, one mole proportion of fatty acid for each hydroxyl group present in the nitro hydroxy compound should be utilized. When the reaction appears to be complete, the molten supernatant layer, consisting essentially of nitro ester, is filtered while hot and then cooled. The product is usually a light-brown wax-like material.

The nitro esters produced in accordance with the general description outlined above are insoluble in water but are readily soluble in benzene and other similar solvents. While fabrics may be satisfactorily waterproofed by treatment with benzene or similar solutions of the aforesaid nitro esters, I have found it preferable, from the standpoint of large scale operation, to utilize these compounds in the form of an aqueous emulsion. In addition to the nitro esters, these emulsions contain a suitable emulsifying agent, such as, for example, a higher fatty acid salt of an amino hydroxy compound and preferably a wax such as paraffin, carnauba, candelilla, ceresin, etc. The presence of a wax in the compositions of my invention is not essential to the procurement of a satisfactory product; however, I have found that the use of wax, in general, results in smoother and more stable emulsions. The fabric to be rendered water-repellent is ordinarily sprayed with, or immersed in, an emulsion of the above general composition. Such emulsions normally contain from 10 to 25% nitro ester, 15 to 25% wax, 2 to 5% emulsifying agent, and the balance consists of water. Frequently it is found desirable to employ from about 5 to 10% of a material which tends to stabilize the emulsion. Methocel (methylcellulose) is a suitable substance for this purpose.

The data appearing in the table which follows demonstrate the water-repellent characteristics of the nitro esters. The tests were carried out with an emulsion having the following composition unless otherwise indicated:

| | Parts by weight |
|---|---|
| Nitro ester | 15 |
| Wax | 25 |
| Oleic acid | 2 |
| 2-amino-2-methyl propanol | 1 |
| Distilled water | 57 |

In certain instances, the emulsion was heated slightly to secure homogeneity. Thereafter, three 8-inch squares of cotton toweling, weighing approximately 13 grams, were immersed in the solution long enough to insure thorough penetration. The toweling samples were then drained and allowed to dry in air at room temperature. Thereafter, one of the samples was ironed, one was baked in an oven for ten minutes at 150°–165° C., while still another sample was neither baked nor ironed. The samples were then tested for water-repellency by means of a spray tester. Each sample was then rated according to a standard chart in which 100 represented perfect water-repellency. After the first test, the samples were washed for one-half hour in 500 cc. of a boiling 0.2% soap solution. They were then rinsed thoroughly, dried and tested as before. The results obtained are shown in the following table:

Table

| Nitro ester | Before washing | | | After 1 wash | | | After 2 washes | | | After 3 washes | | |
|---|---|---|---|---|---|---|---|---|---|---|---|---|
| | Before ironing | After ironing | After baking | Before ironing | After ironing | After baking | Before ironing | After ironing | After baking | Before ironing | After ironing | After baking |
| Tris(stearoxymethyl)-nitromethane | 5 | 65 | 75 | 10 | 75 | 75 | 0 | 45 | 70 | 0 | 55 | 60 |
| Tris(stearoxymethyl)nitromethane [1] | | 45 | 60 | | 40 | 60 | | 35 | 60 | | 40 | 60 |
| 2-nitro-1-butyl stearate | 5 | 50 | 70 | 0 | 65 | 70 | 0 | 40 | 40 | 0 | 10 | |
| 2-nitro-2-methyl-1,3-propanediol distearate | 5 | 50 | 70 | 0 | 70 | 75 | 0 | 65 | 70 | 0 | 60 | 70 |
| 2-nitro-2-methyl-1,3-propanediol monostearate | 10 | 70 | 70 | 0 | 70 | 70 | 0 | 60 | 65 | 0 | 60 | |
| 2-nitro-2-methyl-1,3-propanediol monostearate [1] | | 70 | 70 | | 70 | 75 | | | | | | |
| 2-nitro-2-methyl-1-propyl stearate | 0 | 45 | 60 | 0 | 65 | 65 | 0 | 40 | 65 | 0 | 30 | 55 |
| 2-nitro-2-methyl-1-propyl palmitate | 0 | 45 | 60 | 0 | 55 | 60 | 0 | 40 | 35 | 0 | 10 | 40 |
| Stearoxymethyl-bis(hydroxymethyl)nitromethane | 20 | 70 | 75 | 0 | 75 | 75 | 0 | 70 | 70 | 10 | 60 | 70 |
| Stearoxymethyl-bis(hydroxymethyl)nitromethane [2] | | 60 | 75 | 0 | 70 | 70 | | 60 | 70 | | | |

[1] Water-repellent composition consisted of 25% solution of nitro ester in benzene.
[2] Composition of water-repellent composition same one used in regular test except that it contained no wax.

The above described process of waterproofing is, in general, applicable to all types of cellulosic fabric, including cotton, rayon and linen. It will be evident from the foregoing description that the present invention is subject to numerous modifications. Therefore, it may be said, in general, that the present invention is intended to cover, by the terminology employed in the appended claims, all features of patentable novelty inherent therein.

Having now described my invention, what I claim is:

1. In a process for waterproofing cellulosic textiles, the steps which comprise contacting said textiles with a liquid mixture containing between about 10% and 25% of a nitroester having the following formula

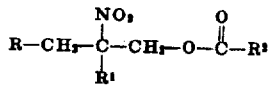

wherein R is a member selected from the group consisting of aliphatic acyloxy, hydrogen, alkyl and hydroxyl, $R^1$ is a member selected from the group consisting of aliphatic acyloxymethyl, hydrogen, alkyl and hydroxy-methyl, and $R^2$ represents an alkyl group having from eleven to seventeen carbon atoms, and thereafter subjecting the textile so treated to a heating operation at a temperature of at least about 150° C.

2. In a process for waterproofing cellulosic textiles, the steps which comprise contacting the textile with an aqueous emulsion containing between about 10% and 25% of stearoxymethyl-bis(hydroxymethyl)nitromethane, and thereafter subjecting said textile to a heating operation at a temperature of at least about 150° C.

3. In a process for waterproofing cellulosic textiles, the steps which comprise contacting the textile with an aqueous emulsion containing between about 10% and 25% of 2-nitro-2-methyl-1,3-propanediol distearate and thereafter subjecting the textile so treated to a heating operation at a temperature of at least about 150° C.

4. In a process for waterproofing cellulosic textiles, the steps which comprise contacting the textile with an aqueous emulsion containing between about 10% and 25% of tris(stearoxymethyl)nitromethane and thereafter subjecting the textile so treated to a heating operation at temperatures of at least about 150° C.

5. In a process for waterproofing cotton textiles, the steps which comprise contacting said cotton textiles with a liquid mixture containing between about 10% and 25% of a nitroester having the following formula

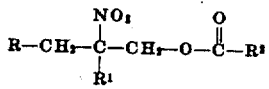

wherein R is a member selected from the group consisting of aliphatic acyloxy, hydrogen, alkyl and hydroxyl, $R^1$ is a member selected from the group consisting of aliphatic acyloxymethyl, hydrogen, alkyl and hydroxymethyl, and $R^2$ represents an alkyl group having from eleven to seventeen carbon atoms, and thereafter subjecting the cotton textile so treated to a heating operation at a temperature of at least about 150° C.

6. A process for imparting water-repellency to cellulosic textile fabrics which comprises impregnating said fabric with a liquid mixture containing a wax and between about 10% and 25% of a nitro ester having the formula:

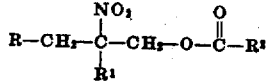

wherein R is a member selected from the group consisting of aliphatic acyloxy, hydrogen, alkyl and hydroxyl; R¹ is a member selected from the group consisting of aliphatic acyloxymethyl, hydrogen, alkyl and hydroxymethyl; and R² represents an alkyl group having from eleven to seventeen carbon atoms inclusive, and thereafter subjecting the textile so treated to a heating operation, at a temperature of at least about 150° C.

7. A process for imparting water-repellency to cellulosic textile fabrics which comprises impregnating said fabric with a liquid mixture containing between 15% and 25% of a wax and between about 10 and 25% of a nitro ester having the formula:

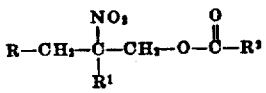

wherein R is a member selected from the group consisting of aliphatic acyloxy, hydrogen, alkyl and hydroxyl; R¹ is a member selected from the group consisting of aliphatic acyloxymethyl, hydrogen, alkyl and hydroxymethyl; and R² represents an alkyl group having from eleven to seventeen carbon atoms inclusive, and thereafter subjecting the textile so treated to a heating operation, at a temperature of at least about 150° C.

HILLARY ROBINETTE, JR.

Certificate of Correction

Patent No. 2,402,776.                                                        June 25, 1946.

HILLARY ROBINETTE, JR.

It is hereby certified that error appears in the printed specification of the above numbered patent requiring correction as follows: Column 3, in the table, first column thereof, last line of the last compound therein, after the syllable and word "yl)nitromethane" insert [1]; and that the said Letters Patent should be read with this correction therein that the same may conform to the record of the case in the Patent Office.

Signed and sealed this 17th day of September, 1946.

[SEAL]

LESLIE FRAZER,
*First Assistant Commissioner of Patents.* wherein R is a member selected from the group consisting of aliphatic acyloxy, hydrogen, alkyl and hydroxyl; $R^1$ is a member selected from the group consisting of aliphatic acyloxymethyl, hydrogen, alkyl and hydroxymethyl; and $R^2$ represents an alkyl group having from eleven to seventeen carbon atoms inclusive, and thereafter subjecting the textile so treated to a heating operation, at a temperature of at least about 150° C.

7. A process for imparting water-repellency to cellulosic textile fabrics which comprises impregnating said fabric with a liquid mixture containing between 15% and 25% of a wax and between about 10 and 25% of a nitro ester having the formula:

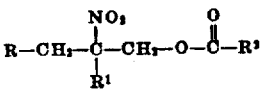

wherein R is a member selected from the group consisting of aliphatic acyloxy, hydrogen, alkyl and hydroxyl; $R^1$ is a member selected from the group consisting of aliphatic acyloxymethyl, hydrogen, alkyl and hydroxymethyl; and $R^2$ represents an alkyl group having from eleven to seventeen carbon atoms inclusive, and thereafter subjecting the textile so treated to a heating operation, at a temperature of at least about 150° C.

HILLARY ROBINETTE, JR.

Certificate of Correction

Patent No. 2,402,776.  June 25, 1946.

HILLARY ROBINETTE, JR.

It is hereby certified that error appears in the printed specification of the above numbered patent requiring correction as follows: Column 3, in the table, first column thereof, last line of the last compound therein, after the syllable and word "yl)nitromethane" insert [1]; and that the said Letters Patent should be read with this correction therein that the same may conform to the record of the case in the Patent Office.

Signed and sealed this 17th day of September, 1946.

[SEAL]

LESLIE FRAZER,
*First Assistant Commissioner of Patents.*